United States Patent [19]

Sotoya et al.

[11] Patent Number: 4,885,112

[45] Date of Patent: Dec. 5, 1989

[54] SURFACE ACTIVE SECONDARY AMIDOAMINO ACID OR SALT COMPOUNDS

[75] Inventors: Kohshiro Sotoya, Wakayama; Makoto Kubo, Wakayama; Kazuhiko Okabe, Wakayama; Masanobu Tanigaki, Wakayama; Masaji Yamanishi, Wakayama; Hajime Hirota, Tokyo, all of Japan

[73] Assignee: Kao Corporation, Tokyo, Japan

[21] Appl. No.: 118,887

[22] Filed: Nov. 10, 1987

[30] Foreign Application Priority Data

Nov. 18, 1986 [JP] Japan .................. 61-274928

[51] Int. Cl.$^4$ .................... C07C 50/22; C07C 101/72
[52] U.S. Cl. .................... 252/352; 252/356; 252/546; 562/448; 562/564; 260/501.11
[58] Field of Search ............... 252/356, 357, 352, 546, 252/547; 564/306, 463, 503; 562/448, 564, 501.11

[56] References Cited

U.S. PATENT DOCUMENTS

| 2,781,384 | 2/1957 | Mannheimer ............. 562/564 X |
| 2,921,085 | 1/1960 | Schramm .................. 252/356 |
| 3,055,836 | 9/1962 | Masci et al. .............. 252/545 |

FOREIGN PATENT DOCUMENTS

| 68868 | 1/1983 | European Pat. Off. . |
| 0224796 | 10/1987 | European Pat. Off. . |
| 3627280 | 2/1987 | Fed. Rep. of Germany . |
| 3639752 | 5/1987 | Fed. Rep. of Germany . |
| 60-168796 | 9/1985 | Japan . |
| 61-067783 | 4/1986 | Japan . |
| 62-039554 | 2/1987 | Japan . |
| 62-063555 | 3/1987 | Japan . |

OTHER PUBLICATIONS

Translation of 62-063555.
Translation of 61-067783.
Patent Abstracts of Japan, (Feb. 26, 1986), vol. 10, No. 49, "Production of Amphoteric Surfactant having Low sodium Chloride Content"; Sekken et al.

*Primary Examiner*—Mary C. Lee
*Assistant Examiner*—C. K. Scalzo
*Attorney, Agent, or Firm*—Oblon, Spivak, McClelland, Maier & Neustadt

[57] ABSTRACT

A surface active agent comprising a specific type of secondary amidoamino acid or ammonium ion or triethanolammonium salt thereof,

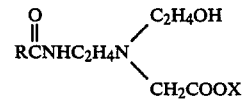

as a major component, and not more than 0.2 mole of an inorganic salt per 100 gm of said secondary amidoamino acid or 100 gm of a salt thereof as converted to the acid type secondary amidoamino acid. The surface active agent can be prepared by subjecting the alkali metal salt of secondary amidoamino acid, usually containing a great amount of impurities such as sodium chloride, to electrodialysis. It has excellent compatibility with various additives such as water-soluble polymer due to its low ionic strength and yet exhibits a good low-temperature stability when made into an aqueous solution owing to its low Krafft point.

10 Claims, 1 Drawing Sheet

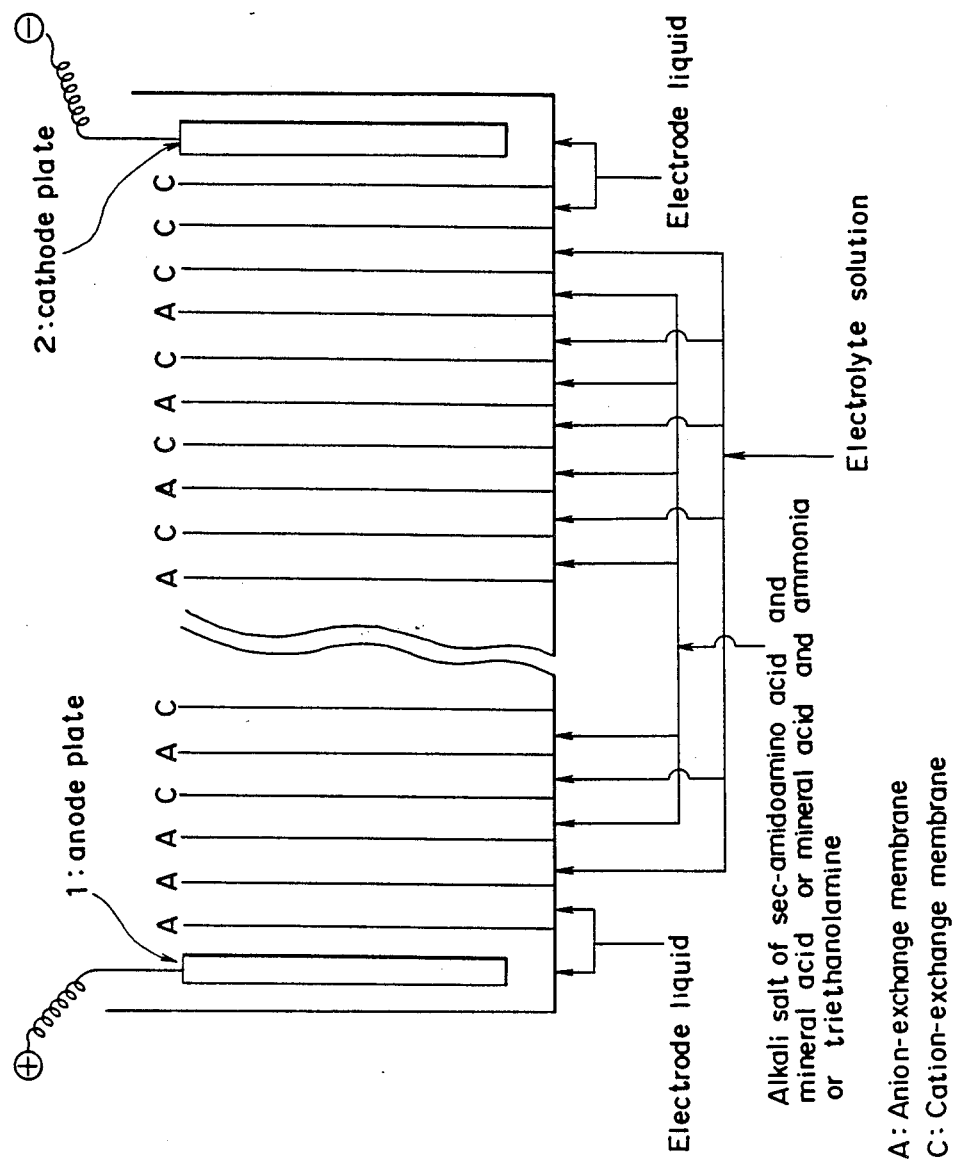

SURFACE ACTIVE SECONDARY AMIDOAMINO ACID OR SALT COMPOUNDS

BACKGROUND OF THE INVENTION

1. Field of the Invention

This invention relates to a surface active agent comprising as its major component a secondary amidoamino acid or a specific salt thereof and, more particularly, a surface active agent which has good compatibility with various additives such as water-soluble polymers or the like, and yet exhibits excellent low-temperature stability as an aqueous solution. The invention also relates to a process for preparing such a surface active agent.

2. Description of the Background

In recent years, there have been increasing demands for household products with high safety and low irritation. The trend is applicable to surface active agents as well, and general preference is directed to surface active agents which are low or only moderately irritating to human skin or eyes. For this reason, imidazoline type surface active agents are being more widely accepted as a base material for shampoos and various kinds of other detergents. imidazoline type surface active agents are manufactured by amphoterizing an alkyl imidazoline, i.e., by reacting an alkyl imidazoline with monochloroacetic acid or its alkali metal salt. The imidazoline type surface active agents thus prepared have long been considered as possessing an imidazoline structure. However, recent studies have revealed the fact that the compounds have a structure derived by ring-opening of imidazoline which is represented, for example, by the following formula (II) or (III):

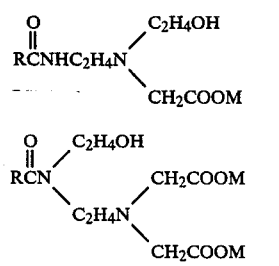

in which M represents an alkali metal and R has the same meaning as defined above.

Today, these surface active agents are still called imidazoline type surface active agents in the art because of this historical background, but in this specification they are described as "amidoamino acid type surface active agents" in order to correctly reflect their structures.

Accordingly, these amidoamino acid type surface active agents can be manufactured by reacting an alkyl imidazoline or an amidoamine which is the hydrolyzate of an alkyl imidazoline with monochloroacetic acid or its alkali metal salt. However, since this reaction is carried out in the presence of an alkali, NaOH for example, in order to neutralize acid to increase the reaction yield, the resulting amidoamino acid surface active agents inevitably contain a great amount of an inorganic salt, NaCl for example, which is a byproduct of reaction.

These amidoamino acid type surface active agents containing a great amount of an inorganic salt have several drawbacks. That is, they (i) increase the viscosity of the final product, (ii) decrease the low temperature stability of a formulated product, and (iii) are difficult to formulate with other active ingredients, e.g., the compounded products may cause emulsion breaking. For these reasons, there have been various limitations imposed on formulating these amidoamino acid type surface active agents to products.

A number of studies have, therefore, been carried out for decreasing byproduct inorganic salts contained in these glycine type amidoamino acid surface active agents. For instance, a method to refine such surface active agents by means of solvent extraction is proposed in Japanese Patent Application Disclosure No. 75998/1984. This method, however, requires elimination and recovery of the extraction solvent which involves more cost. Also, the products obtained do not always satisfy the required compatibility with other additives and low-temperature stability.

In these situations, the present inventors have made earnest and extensive studies in order to resolve the above problems, and found that the drawbacks as mentioned above can be resolved by converting a counter ion of an amidoamino acid type surface active agent represented by formula (II) hereinbelow into hydrogen, ammonium ion or triethanolammonium ion by a specific method, and at the same time by decreasing the salt content to less than a certain level. These findings have led to the completion of this invention.

SUMMARY OF THE INVENTION

Accordingly, an object of this invention is to provide a surface active agent comprising a secondary amidoamino acid or a salt thereof represented by the following formula (I):

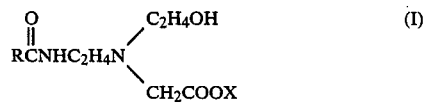

in which R represents an alkyl group, hydroxyalkyl group, aralkyl group or alkenyl group having from 7 to 23 carbon atoms and X represents a hydrogen atom, ammonium ion or triethanolammonium ion, as a major component, and not more than 0.2 mole of an inorganic salt per 100 gm of said secondary amidoamino acid or 100 gm of a salt thereof as converted to the secondary amidoamino acid.

It is extremely difficult to convert an alkali ion of an alkali metal salt of a secondary amidoamino acid (II) into the counter ion represented by X. For instance, when the compound (II) is neutralized by a mineral acid such as hydrochloric acid and the like, the obtained product comprises the following compounds (II), (IV) and (V), with compound (V), that in which X in the formula (I) is a hydrogen atom, being contained in as much a proportion as 50%. This is also applicable to cases where the counter ion is an ammonium or triethanolammonium ion.

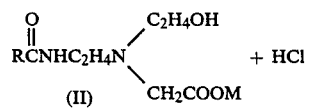

-continued

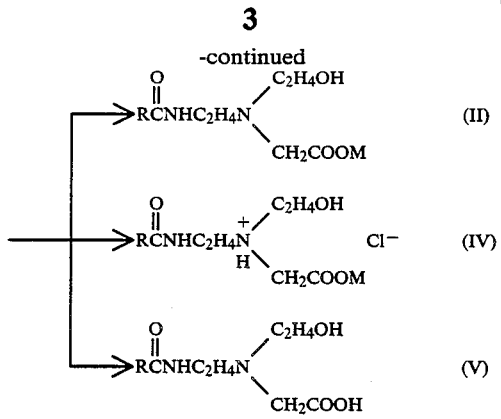

in which R and M have the same meanings as defined above.

However, converting the counter ion into X as well as decreasing the content of an inorganic salt have been successfully accomplished by the present inventors by subjecting an alkali metal salt of a secondary amidoamino acid to electrodialysis in the presence of a mineral acid, or a mineral acid and triethanolamine or ammonia.

Accordingly, the present invention also provides a process for preparing a secondary amidoamino acid or a salt thereof represented by the formula (I) which contains not more than 0.2 mole of an inorganic salt per 100 gm of said secondary amidoamino acid or 100 gm of a salt thereof as converted to the secondary amidoamino acid, by subjecting an alkali metal salt of a secondary amidoamino acid represented by the formula (II) to electrodialysis in the presence of a mineral acid, or a mineral acid and triethanolamine or ammonia.

The alkali metal salt of a secondary amidoamino acid of the formula (II) which is the raw material can be prepared by reacting alkyl imidazoline (VI) or amidoamine (VII) with monohaloacetic acid in the presence of an alkali.

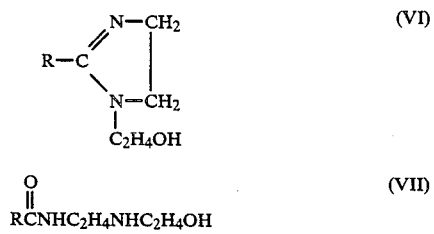

in which R represents the same meaning as defined above.

BRIEF DESCRIPTION OF THE DRAWINGS

Sole FIGURE is a schematic drawing showing an example of an electrodialysis cell used in this invention.

DETAILED DESCRIPTION OF THE INVENTION AND PREFERRED EMBODIMENTS

The reaction of an alkylimidazoline or amidoamino acid (hereinafter collectively referred to as "raw material amine") and a salt of monochloroacetic acid in an aqueous or lower alcohol solvent may be carried out according to known methods. Specifically, when the raw material amine is imidazoline, imidazoline is first converted to amidoamine (VII) by ring-opening using an alkali solution at 80°-90° C. The raw material amine is reacted with monohaloacetic acid or a salt thereof in water and/or lower alchohol solvent at 50°-90° C. while stirring, and then an alkali is added to the reaction mixture dropwise so as to maintain the pH of the mixture in a range of from 8 to 9. Alternatively, the raw material amine and a salt of monohaloacetic acid are charged to the reactor together with an alkali salt such as $Na_2CO_3$ and $NaHCO_3$, and the reaction is effected at 50°-90° C. under stirring. It is desirable that the reaction temperature be between 50° C. and 90° C. At a temperature of below 50° C. the reaction is retarded, because the raw material amine is hard to dissolve at such temperature. On the other hand, at a temperature higher than 90° C., coloration and decomposition of amphoteric surface active agent are predominant. The reaction can be carried out either at atmosphere pressure or under pressure.

The raw material amine used in this invention includes 1-hydroxyethyl-2-heptylimidazoline, 1-hydroxyethyl-2-undecylimidazoline, 1-hydroxyethyl-2-heptadecylimidazoline, N-lauroyl-N'-hydroxyethylethylenediamine, N-stearoyl-N'hydroxyethylethylenediamine, and the like. Monohaloacetic acid or the salt thereof include monochloroacetic acid, monobromoacetic acid, sodium monobromoacetate, potassium monobromoacetate, and the like. The alkali may be caustic soda, caustic potash, sodium carbonate, potassium carbonate, sodium bicarbonate, potassium bicarbonate, or the like.

The amount of monohaloacetic acid or the salt thereof to be used in the reaction may be as much as 1.0 times the raw material amine in terms of mole ratio. The ratio smaller than 1.0 is not desirable because the amphoterizing ratio of the raw material amine decreases. Therefore, it is desirable that the above ratio be between 1.0 and 3.0. The amount of alkali may usually be 1.6-2 equivalence of monohaloacetic acid and 0.8-1.0 equivalence of the salt of monohaloaceti acid.

The reaction mixture obtained by this reaction contains a great amount of an inorganic salt such as NaCl. According to this invention the reaction product containing an alkali metal salt of secondary amidoamino acid can be subjected to electrodialysis as it is.

The term "electrodialysis" as used in this invention means an operation providing cation-exchange membranes and anion-exchange membranes being alternately disposed, charging an alkali salt of secondary amidoamino acid and a mineral acid, or a mineral acid and ammonia or triethanol amine, to each of every other partition chambers (organic chambers) formed by the two kinds of membranes, charging an electrolyte to each of the remaining chambers (electrolyte chambers), and supplying DC current through these chambers, by which an acid or salt, or the salt to be exchanged migrates from the organic chamber to the electrolyte chamber.

There is no specific limitation to the mineral acid to be employed in this invention. It can be hydrochloric acid, sulfuric acid, phosphoric acid, or the like. Among these, hydrochloric acid is particularly preferred.

The mineral acid and triethanol amine or ammonia may be added to an alkali metal salt of a secondary amidoamino acid in any order. Or, alternatively, the mineral acid and triethanol amine or ammonia may be mixed in advance and then added to the alkali metal salt of a secondary amidoamino acid. The mineral acid and triethanol amine or ammonia may be charged to organic chambers together with the alkali metal salt of a secondary amidoamino acid at the beginning, or they may be afterward continuously administered to the organic chambers while the electrodialysis is conducted.

The amount of triethanolamine or ammonia to be used is preferably 1–3 moles of the alkali metal salt of a secondary amidoamino acid. The smaller amount only results in an inadequate ion exchange performance, while use of these materials exceeding this range either results in a surplus of these materials remaining in the system after electrodialysis or requires a longer period of time for carrying out electrodialysis. The amount of the mineral acid may be 0.8–1.5 moles of the amount of triethanolamine or ammonia. An amount below this range will result in an inadequate ion exchange performance, while a greater amount results in a surplus of these materials remaining in the system after electrodialysis and thus is undesirable.

It is necessary in this invention to adjust the concentration of each material in the solution to be electrodialyzed so that the product or an inorganic salt may not deposit during electrodialysis. In general practice, it is desirable that the concentration of the alkali metal salt of secondary amidoamino acid be around 10%–30%.

The sole FIGURE schematically illustrates one embodiment of the cell used in such electrodialysis. The present invention will further be illustrated more specifically referring to the FIGURE. As shown in the FIGURE, anion-exchange membranes (A) and cation-exchange membranes (C) are alternately arranged and a plurality of their pairs are provided. The alkali salt of a secondary amidoamino acid and a mineral acid, or a mineral acid and ammonia or triethanol amine are charged to each chamber provide by these two membranes. The electrolyte solution is charged to each of the chambers adjacent to each of the above-mentioned partition chambers and a DC current is supplied through them. There is no specific limitation to the electrolyte to be used and any material capable of dissociating in water or under potential gradient may be used. Those preferably employed are inorganic salts such as sodium chloride, sodium sulfate, potassium chloride, potassium sulfate, ammonium chloride and ammonium sulfate. Further, the aqueous solution of the electrolyte as described above may be used as the electrode solution in chambers in which the electrode plate is placed and those chambers adjacent thereto. Each of these solutions is preferably circulated by means of pumps and the like. The value of the electrical current is desirably lower than the limiting current density, which greatly varies depending on the kind. concentration and temperature of the solution and the shape of the dialyzing cell. A current density of about 0.1 to 10 A/dm$^2$ is generally suitable, though it is not strictly limited to this range. This invention is carried out by using the system of electrodialysis as described above, but it is necessary to charge the organic chambers with a substance which dissociates under the potential gradient and which contains hydrogen ions as the dissociated ions. Such substances may be, for example, water and organic acids such as acetic acid, formic acid, glycolic acid and propionic acid; as well as mineral acids such as sulfuric acid, hydrochloric acid and phosphoric acid, the presence of water being particularly preferred. The water or the acids may be present as the sole solvent for the alkali metal salt of secondary amidoamino acid, or as a mixture with a solvent such as alcohol.

The process according to this invention has made it possible to produce acid type ammonium or triethanolammonium salt of a secondary amidoamino acid in a simple procedure with a high yield and of a high quality with industrial safety and ease (that can not be obtained so far by the conventional neutralization and acidifying method).

Further, while the alkali metal salt of secondary amidoamino acid used as a raw material in the process of this invention generally contains a great amount of impurities such as sodium chloride, unreacted halogenized carboxylic acid and hydrolysates thereof, which are formed during its preparation, most of the impurities can be eliminated from the system through electrodialysis, and thus purification can be carried out simultaneously with the preparation according to this invention.

Moreover, the surface active agents according to this invention have excellent compatibility with various additives such as water-soluble polymer due to its low ionic strength and a good low-temperature stability when made into an aqueous solution owing to its low Krafft point.

Other features of the invention will become apparent in the course of the following description of the exemplary embodiments which are given for illustration of the invention and are not intended to be limiting thereof.

EXAMPLES

Example 1

To a four-necked flask equipped with a stirrer, a condenser, a dropping funnel and a thermometer, 268 gm (1 mole) of 1-hydroxyethyl-2-laurylimidazoline, 90 gm of water and 2 gm of sodium hydroxide were charged. The mixture was stirred while raising its temperature to 80° C., at which temperature the stirring was continued for about 2 hours to effect ring-opening of imidazoline. Then, a separately prepared solution of 233 gm (2 mole) of sodium monochloroacetate in 427.0 gm of water was added to the flask. Further, 200 gm of a 40% aqueous solution of sodium hydroxide was added dropwise to the mixture in 4 hours, while maintaining the mixture at 70°–80 ° C. After the completion of the addition, the mixture was digested at 75°–80° C. to obtain a 30% aqueous solution of N-lauroyl-N'-2-hydroxyethyl-N'-sodiumcarboxymethylethylenediamine, to which 149.2 gm (1mole) of triethanolamine was added. The resulting solution was cooled to provide a brown liquid with a pH of about 9.

The solution thus obtained was subjected to electrodialysis.

The electrodialysis was conducted by circulating a solution of N-lauroyl-N'-2-hydroxyethyl-N'sodiumcarboxymethylethylenediamine to partition chambers (organic chamber) interposed between anion-exchange membranes (A) and cation-exchange membranes (C) in FIG. 1, 1% aqueous saline solution to adjacent partition chambers (electrolyte chamber) and a 3% aqueous sodium sulfate solution as the electrode solution, and supplying a DC current. The electrodialysis was carried out in four hours while adding 213.8 gm (2.05 mole) of 35% hydrochloric acid evenly to the above mixed solvent.

The electrodialyzing device used in this example comprises 10 sheets each of anion- and cation-exchange membranes each of 0.02 m$^2$ The electrical current supplied for 12 hours, with the initial current density being 2 A/dm². The final current density after 12 hours was 0.1 A/dm².

In this manner, a 35% solution of N-lauroyl-N'-2-hydroxyethyl-N'-triethanolaminocarboxymethylethylenediamine was obtained. The analysis of Na and triethanolamine by liquid chromatography of this product indicated that 98% of the counter ions have been exchanged, and the analysis of Cl indicated that the content of NaCl is 1.43% (0.024 mole) per 143 gm (100 gm as converted to the acid type) of N-lauroyl-N'-2-hydroxyethyl-N'-triethanolaminocarboxymethylethylenediamine. A portion of the product was dried in vacuo and analyzed by infrared spectrum. The product was identified as the above compound.

Example 2

To a four-necked flask equipped with a stirrer, a condenser, a dropping funnel and a thermometer, 268 gm (1 mole) of 1-hydroxyethyl-2-laurylimidazoline, 90 gm of water and 2 gm of sodium hydroxide were charged. The mixture was stirred while raising its temperature to 80° C., at which point the stirring was continued for about 2 hours to effect ring-opening of imidazoline. Then, a separately prepared solution of 233 gm 2 mole) of sodium monochloroacetate in 427.0 gm of water was added to the flask. Further, 200 gm of 40% aqueous solution of sodium hydroxide was added dropwise to the mixture in 4 hours, while maintaining the mixture at 70°–80° C. After the completion of the addition, the mixture was digested at 75°–80° C. to obtain a 30% aqueous solution of N-lauroyl-N'-2-hydroxyethyl-N'sodiumcarboxymethylethylenediamine.

The solution thus obtained was subjected to electrodialysis.

The electrodialysis was conducted by circulating the solution of N-lauroyl-N'-2-hydroxyethyl-N'-sodiumcarboxymethylethylenediamine to partition chambers (organic chamber) interposed between anion-exchange membranes (A) and cation-exchange membranes (C) in FIG. 1, 1% aqueous saline solution to adjacent partition chambers (electrolyte chamber) and a 3% aqueous sodium sulfate solution as the electrode solution, and supplying a DC current. The electrodialysis was carried out in four hours while adding 532 gm (2.0 mole) of 20% NH₄Cl evenly to the above mixed solvent.

The electrodialyzing device used in this example comprises 10 sheets each of anion- and cation-exchange membranes each of 0.02 m² The electrical current supplied for 12 hours, with the initial current density being 2 A/dm². The final current density after 12 hours was 0.1 A/dm².

In this manner, a 20% solution of N-lauroyl-N'-2-hydroxyethyl-N'-ammoniocarboxymethylethylenediamine was obtained. The analysis of Na and nitrogen in this product indicated that 95% of the counter ions have been exchanged, and the analysis of Cl indicated that the content of NaCl is 2.1% (0.036 mole) per 105 gm (100 gm as converted to the acid type) of N-lauroyl-N'-2-hydroxyethyl-N'ammoniocarboxymethylethylenediamine. A portion of the product was dried in vacuo and analyzed by infrared spectrum. The product was identified as the above compound.

Example 3

To a four-necked flask equipped with a stirrer, a condenser, a dropping funnel and a thermometer, 268 gm (1 mole) of 1-hydroxyethyl-2-laurylimidazoline, 90 gm of water and 2 gm of sodium hydroxide were charged. The mixture was stirred while raising its temperature to 80° C., at which point the stirring was continued for about 2 hours to effect ring-opening of imidazoline. Then, a separately prepared solution of 233 gm (2 mole) of sodium monochloroacetate in 2347.2 gm of water was added to the flask in 1 hour, while maintaining the temperature at 70°–80° C. Subsequently, 200 gm of 40% aqueous solution of sodium hydroxide was added dropwise to the mixture in 4 hours at the same temperature. After the completion of the addition, the mixture was digested at 75°–80° C. to obtain approximately 12% aqueous solution of N-lauroyl-N'-2-hydroxyethyl-N'-sodiumcarboxymethylethylenediamine, to which 213.8 gm of 35% hydrochloric acid was added in 3 hours. The resulting solution was cooled and 3354 gm of an approximately 12 % aqueous solution of hydrochloride of N-lauroyl-N'-2-hydroxyethyl-N'-sodiumcarboxymethylethylenediamine of the following formula was obtained.

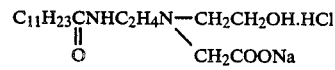

This was a pale brown viscous liquid with a pH of about 2.5.

This solution was subjected to electrodialysis using the same device in Example 1 for 15 hours. The same electrolyte and electrode solution as in Example 1 were used. The electrical current supplied was 1.5 A/dm², with the final current density after 15 hours was 0.1 A/dm².

After electrodialysis water contained in the product was completely eliminated by drying in vacuo to obtain white powdery crystals. The analysis of Amine Value, Acid Value, IR and NMR indicated the formation of N-lauroyl-N'-2-hydroxyethyl-N'-carboxymethylethylenediamine. The purity of this substance as the acid type was calculated from analysis of Na and Cl to be 97%, and the content of NaCl was 1.4% (0.024 mole) per 100 gm of N-lauroyl-N'-2-hydroxyethyl-N'carboxymethylethylenediamine. The substance was recrystallized from ethanol-acetone and subjected to elementary analysis, which revealed that the product was the target compound of the following formula:

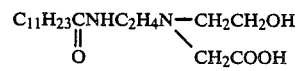

The results of the elementary analysis are shown in

Table 1

| | Calculated | Found |
|---|---|---|
| C | 62.76% | 62.84% |
| H | 10.53 | 10.59 |
| N | 8.13 | 8.16 |
| O | 18.58 | 18.47 |

Test Example

The detergents in Table 2 were prepared and the solubility of a water-soluble polymeric compound methylcellulose (Creaminal MC; produced by Henkel Co.)] in each of the detergents was measured and the low temperature stability (stored at −5° C. for 1 week) of each detergent was observed. The results are shown in Table 2, in which the followin symbols for expressing the results of evaluation are applied:

Solubility:
AAA: completely dissolved
BBB: partially dissolved
CCC: not dissolved Low-temperature Stability
AAA: transparent liquid
BBB: semitransparent liquid
CCC: deposition took place Obviously, numerous modifications and variations of the present invention are possible in light of the above teachings. It is therefore to be understood that the scope of the appended claims, the invention may be practiced otherwise than as specifically described herein.

salt is calculated according to the following equation:

$$\text{moles of inorganic salt per 100 grams secondary amidoamino acid salt} = \frac{\text{moles inorganic salt in surface active agent}}{\text{grams of secondary amidoamino acid salt in surface active agent} \times \frac{\text{mol wt. of secondary amidoamino acid salt}}{\text{mol wt. of secondary amidoamino acid}}} \times 100.$$

2. The surface active agent of claim 1, wherein said inorganic salt is an alkali metal halide.

3. The surface active agent of claim 1, wherein said inorganic salt is sodium chloride.

TABLE 2

| Detergent No. | 1 | 2 | 3 | 4 | 5 | 6 | 7 | 8 | 9 | 10 |
|---|---|---|---|---|---|---|---|---|---|---|
| $C_{11}H_{23}\underset{\underset{O}{\|\|}}{C}NHC_2H_4N\big<\!\!\begin{smallmatrix}C_2H_4OH\\CH_2COOH.N(C_2H_4OH)_3\end{smallmatrix}$ (Synthetic Example 1) | 10 | | | | 10 | 10 | 10 | | 10 | |
| $C_{11}H_{23}\underset{\underset{O}{\|\|}}{C}NHC_2H_4N\big<\!\!\begin{smallmatrix}C_2H_4OH\\CH_2COOH.NH_3\end{smallmatrix}$ (Synthetic Example 2) | | 10 | | 10 | | | | | | |
| $C_{11}H_{23}\underset{\underset{O}{\|\|}}{C}NHC_2H_4N\big<\!\!\begin{smallmatrix}C_2H_4OH\\CH_2COOH\end{smallmatrix}$ (Synthetic Example 3) | | | 5 | | | | | 5 | | |
| $C_{11}H_{23}\underset{\underset{O}{\|\|}}{C}NHC_2H_4N\big<\!\!\begin{smallmatrix}C_2H_4OH\\CH_2COONa\end{smallmatrix}$ (Comparative Example 1) | | | | | | | | | | 10 |
| NaCl (moles per 100 g sec-amidoamino acid as converted to acid type) | 0.024 | 0.036 | 0.024 | 0.10 | 0.15 | 0.20 | 0.25 | 0.30 | 0.40 | 0.05 |
| Methylcellulose | 1 | 1 | 1 | 1 | 1 | 1 | 1 | 1 | 1 | 1 |
| Ion exchange water | balance | " | " | " | " | " | " | " | " | " |
| Solubility | AAA | AAA | AAA | AAA | AAA | AAA | BBB | CCC | CCC | CCC |
| Low-temperature stability | AAA | AAA | AAA | AAA | AAA | AAA | CCC | CCC | CCC | CCC |

What is claimed as new and desired to be secured by Letters Patent is:

1. A surface active agent comprising:
(A) a secondary amidoamino acid or a salt thereof having the formula (I):

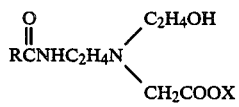    (I)

wherein R is an alkyl group, hydroxyalkyl group, aralkyl group or alkenyl group having from 7 to 23 carbon atoms and X is a hydrogen atom, ammonium ion or triethanolammonium ion, and wherein said surface active agent contains
(B) not more than 0.2 moles of an inorganic salt per 100 grams of said secondary amidoamino acid or per 100 grams of said secondary amidoamino acid salt, wherein the content of inorganic salt in moles per 100 grams of said secondary amidoamino acid 4. The surface active agent of claim 1, wherein X is a hydrogen atom.

5. The surface active agent of claim 1, wherein X is an ammonium ion.

6. The surface active agent of claim 1, wherein X is a triethanolammonium ion.

7. The surface active agent of claim 1, wherein R is a $C_{7-23}$ alkyl group.

8. The surface active agent of claim 7, wherein R is a $C_{7-18}$ alkyl group.

9. The surface active agent of claim 1, wherein said surface active agent contains mot more than 0.15 moles of said inorganic salt per 100 grams of said secondary amidoamino acid or per 100 grams of said secondary amidoamino acid salt.

10. The surface active agent of claim 1, wherein said surface active agent contains not more than 0.10 moles of said inorganic salt per 100 grams of said secondary amidoamino acid or per 100 grams of said secondary amidoamino acid salt.

* * * * *